United States Patent [19]

Knoth et al.

[11] Patent Number: 4,541,053

[45] Date of Patent: Sep. 10, 1985

[54] ELECTRONICALLY CONTROLLED POSTAGE METERING MACHINE AND FREE STAMPING MACHINE

[75] Inventors: Norbert Knoth; Friedrich V. Miehe, both of Berlin, Fed. Rep. of Germany

[73] Assignee: Francotyp Gesellschaft mbH, Berlin, Fed. Rep. of Germany

[21] Appl. No.: 358,699

[22] Filed: Mar. 16, 1982

[30] Foreign Application Priority Data

Mar. 23, 1981 [DE] Fed. Rep. of Germany ....... 3111953

[51] Int. Cl.[3] ............................................. G06F 15/20

[52] U.S. Cl. .................................... 364/466; 318/696

[58] Field of Search ................ 364/466, 464; 318/696, 318/685; 101/90, 91, 101

[56] References Cited

U.S. PATENT DOCUMENTS

| | | | |
|---|---|---|---|
| 4,114,750 | 9/1978 | Baeck et al. | 318/685 |
| 4,180,856 | 12/1979 | Check, Jr. et al. | 364/466 |
| 4,320,461 | 3/1982 | Dlugos | 364/466 |
| 4,401,931 | 8/1983 | Kulterman et al. | 318/696 |
| 4,410,961 | 10/1983 | Dlugos et al. | 364/466 |
| 4,410,962 | 10/1983 | Daniels et al. | 364/466 |

FOREIGN PATENT DOCUMENTS

| | | | |
|---|---|---|---|
| 8041332 | 12/1980 | United Kingdom | 364/464 |

*Primary Examiner*—Joseph Ruggiero
*Attorney, Agent, or Firm*—Herbert L. Lerner; Laurence A. Greenberg

[57] ABSTRACT

Electronically controlled postage metering machine and/or free stamping machine having a microprocessor, a non-volatile memory and a register by means of which adjustment of postage values, date, type of mailing and cleaning of a preset value with actually charged postage sum, including peripheral lines and a keyboard connected to the microprocessor, the non-volatile memory and the register for introducing variable information and signals for linkage with preset data stored in the memory control modules prestaged to the non-volatile memory, the keyboard and the register for blocking direct access via the peripheral lines to the non-volatile memory and for unloading the microprocessor, the control module having means cooperating with the register for controlling phase adjustment of stepping motors for print rollers of the postage metering machine via non-inverted and inverted outputs of the register, and stationary sensor means for establishing positions of the stepping motors and for transmitting information relative thereto to the microcomputer.

13 Claims, 4 Drawing Figures

ELECTRONICALLY CONTROLLED POSTAGE METERING MACHINE AND FREE STAMPING MACHINE

The invention relates to electronically controlled postage metering and free stamping machines.

Postage metering machines and free stamping machines serve for efficient and economical franking of letters and package mailings. For this purpose, machines are employed which effect the adjustment or setting and the printing of the value or amount of postage, the date, the type of mail and an advertising stereotype, and additionally calculate the amount of postage by mechanically controlled components. Such a machine formed of mechanical adjusting means requires costly manufacture and maintenance.

In order to achieve economical manufacture and to simplify, simultaneously, the maintenance of such machines, the use of electronic and electrical components is proposed.

It is accordingly an object of the invention to provide a largely electronically controlled postage metering machine and free stamping machine, respectively, which require relatively less production expense and have a volumetric size considerably reduced with respect to purely mechanical machines of these general types.

With the foregoing and other objects in view, there is provided in accordance with the invention, an electronically controlled postage metering machine and/or free stamping machine having a microprocessor, a non-volatile memory and a register by means of which adjustment of postage values, date, type of mailing and clearing of a preset value with actually charged postage sum, including peripheral lines and a keyboard connected to the microprocessor, the non-volatile memory and the register for introducing variable information and signals for linkage with preset data stored in the memory, control modules prestaged to the non-volatile memory, the keyboard and the register for blocking direct access via the peripheral lines to the non-volatile memory and for unloading the microprocessor, the control module having means cooperating with the register for controlling phase adjustment of stepping motors for print rollers of the postage metering machine via non-inverted and inverted outputs of the register, and stationary sensor means for establishing positions of the stepping motors and for transmitting information relative thereto to the microcomputer.

In accordance with another feature of the invention, the stepping motors are operable in parallel, and including two driver stages connected thereto for supplying phase control data simultaneously to all of the stepping motors, one of the drivers supplying drive energy only to those stepping motors which have not yet reached the nominal position thereof.

In accordance with a further feature of the invention, the phase adjustment control means include phase terminals to which diodes are connected for decoupling the phase terminals during parallel operation of the stepping motors.

In accordance with an additional feature of the invention, there is provided an adjustment means actuatable by the stepping motors, the adjustment means carrying control means for acting on the sensor means.

In accordance with an added feature of the invention the sensor means comprise Hall probes with an open collector output.

In accordance with yet another feature of the invention, the sensor means comprise optical components having an open collector output.

In accordance with yet a further feature of the invention, the sensor means comprise capacitive sensors with an open collector output.

In accordance with yet an additional feature of the invention, the sensor means comprise a multiplicity of mutually connected sensors forming a matrix thereof.

In accordance with yet an added feature of the invention, there are provided transistors connected to the sensors, and a positive voltage supply connected via the transistors to the sensors.

In accordance with an alternate feature of the invention, the transistors address signal transmitters for the position of the stepping motors.

In accordance with still a further feature of the invention, there is provided a time delay means for delaying to the microprocessor printing releasing signals of the sensor means for offsetting the printing image.

In accordance with still an additional feature of the invention, the keyboard has means for controlling the time delay.

In accordance with concomitant feature of the invention, there is provided an accumulator operatively associated with the microprocessor, the non-volatile memory, the keyboard and the register, the accumulator serving to supply power to the electronic components, the keyboard and a display.

Other features which are considered as characteristic for the invention are set forth in the appended claims.

Although the invention is illustrated and described herein as embodied in an electronically controlled postage metering machine and free stamping machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

In all of the figures of the drawing, like assemblies and parts bear the same reference numerals.

Figure 1:
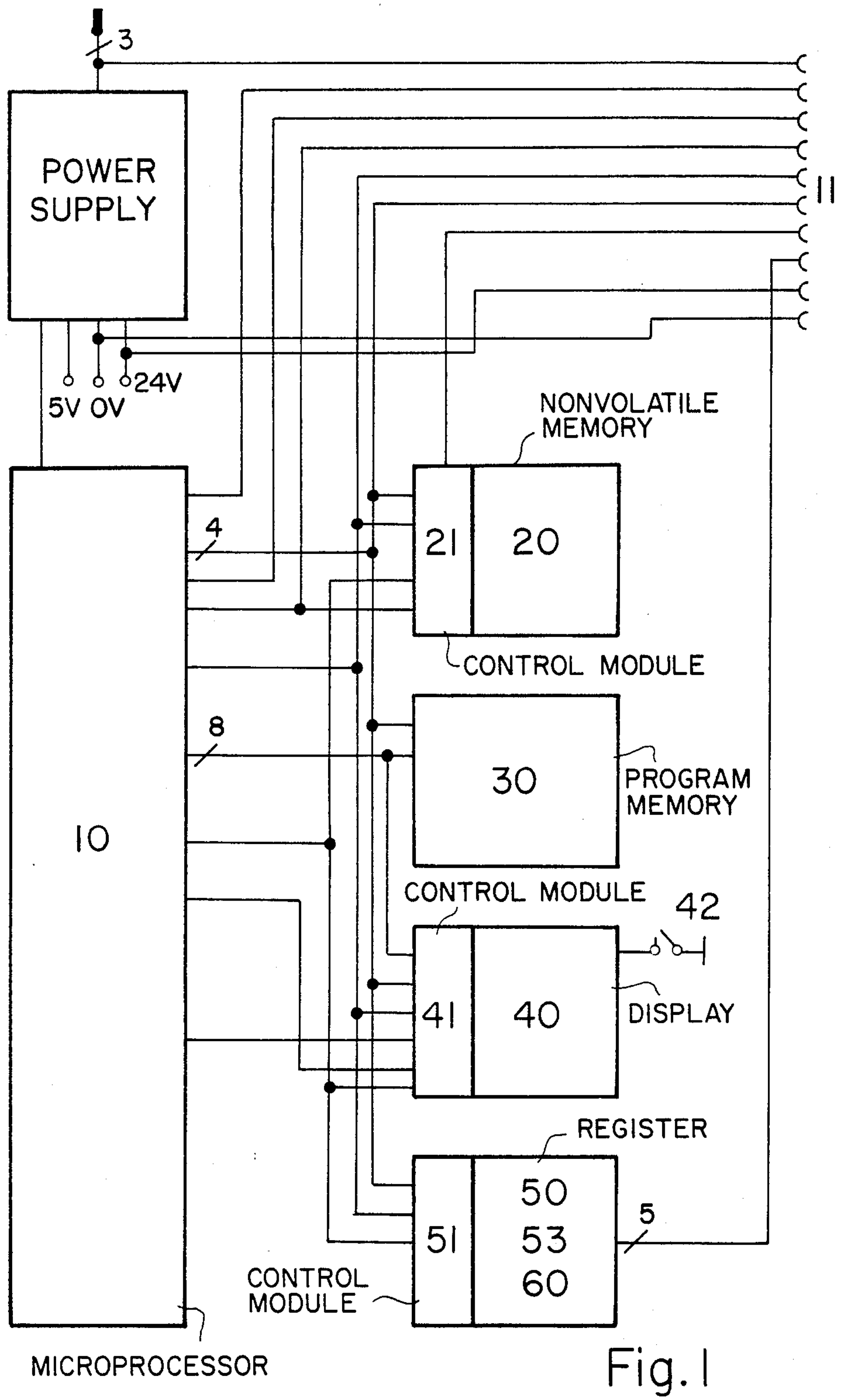
FIG. 1 is a block diagram of the electronic control section according to the invention of a postage metering machine.

Referring now more specifically to the drawing and first to FIG. 1 thereof, there is shown a control part of a postage metering machine formed, in essence, of a microprocessor 10, a nonvolatile memory 20, a program memory 30, a keyboard and display device 40 and a register 50. A power supply provides the various assemblies with respective voltages, an accumulator being associated with the control units 10, 20, 40 and 50 and being loaded during operation and switched on for a limited time to supply energy to the electronic keyboard and display components. Control components or modules 21, 41 and 51, are prestaged to the non-volatile memory 20, the keyboard and display device 40 and the register 50, respectively. The control modules 21, 41 and 51 protect the post-staged modules or components 20, 40 and 50 against uncontrollable voltages across the peripheral lines 11. Outer influence upon the computed values filed in the non-volatile memory 20 is thereby also obviated, a read-out via the peripheral lines 11 being possible. The non-volatile memory 20 may be read-write memory with a battery supply for possible voltage interruption, or a memory operating on a magnetic basis or a memory operating on the basis of charge carrier displacements which is electrically erasable. Register contents, equipment parameters as well as all of the deduction or clearing values or amounts are stored in the non-volatile memory 20. Because of the preconnected control module 21, for a normal operating run, the read and write operations are controlled via the microprocessor 10, whereas only a readout of the memory 20 is possible via the peripheral lines 11.

To introduce or feed-in the postage values or amounts, the date, the type of mailing, and other values, a keyboard and display device 40 with a pre-associated control module 41 is provided. Input can also be effected via the peripheral lines 11. The keyboard 40 together with the data recalled from the program memory 30 acts on the register 50, which controls the adjustment or setting of the print values or amounts. Since the program memory 30 is constructed as a non-variable operational memory, an associated control module is not required. The control module 41 for the keyboard 40 monitors the key input functions and the display. Via the control module 41, also, the present postage sums are furthermore introduced. An additional receipt-printing key 42 serves for releasing the printing when an established maximum postage amount has been exceeded.

Figure 2:
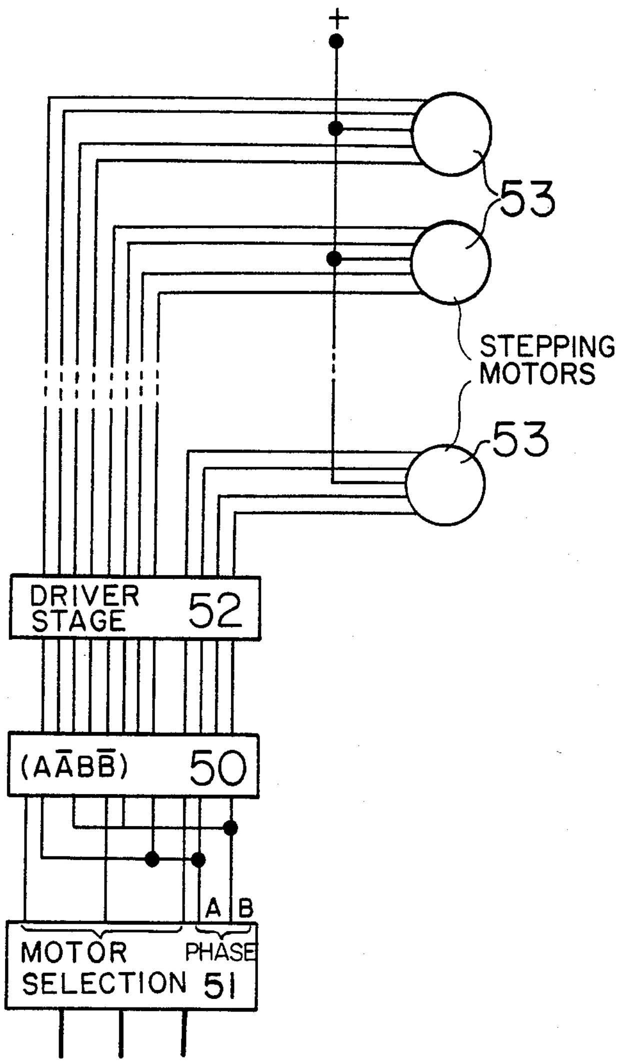
FIG. 2 is a further block diagram of the register control of stepping motors in accordance with the invention.

The values for print roller adjustment introduced by means of the keyboard 40 are delivered via the microprocessor 10 to the register 50 by means of which stepping motors 53 are controlled. Different controls are possible for the adjustment of the unipolar stepping motors 53. The embodiment shown in FIG. 2 is preferred and provides for control, via the register 50 and a driver stage 52, of the phase adjustment or setting of the stepping motors 53 through inverted and non-inverted outputs A, $A\bar{A}$, B, $\bar{B}$ of the register 50. Addressing of the stepping motors 53 is controlled via a clock or activating terminal of the register 50. The non-moving motors, are thereby also maintained at the maximum possible moment or torque during the adjustment or setting operation. Furthermore, this type of connection of the stepping motors 53 affords both parallel operation as well as triggering of individual motors by a simple modification in the program memory 30.

Figure 3:
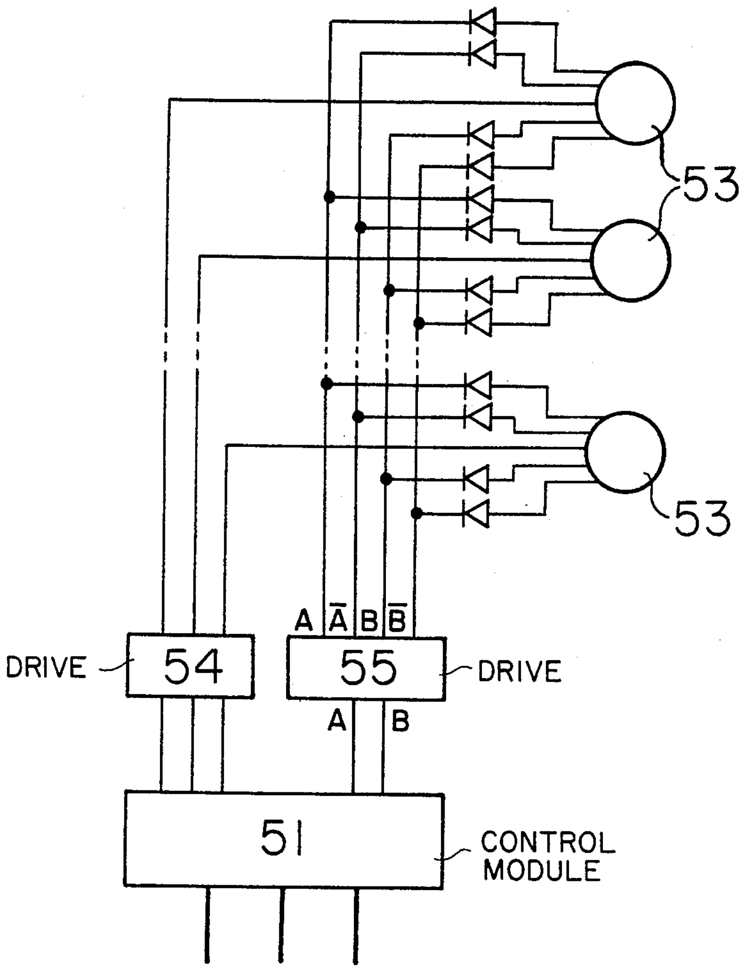
FIG. 3 is another embodiment of the stepping motor control of FIG. 2 in parallel connection.

FIG. 3 illustrates another embodiment of the means for adjusting the stepping motors 53. In FIG. 3, the stepping motors 53 operate in parallel. Two drives 54, 55 are provided, one driver 55 for phase control and another driver 54 for motor control. All of the stepping motors 53 receive the same phase information via the one driver 55, and the switching-on and off of the motors, respectively, to and from the power supply occurs preferable via the center-tapped terminal of the respective motor. In this regard, the phase terminals are decoupled by diodes.

Figure 4:
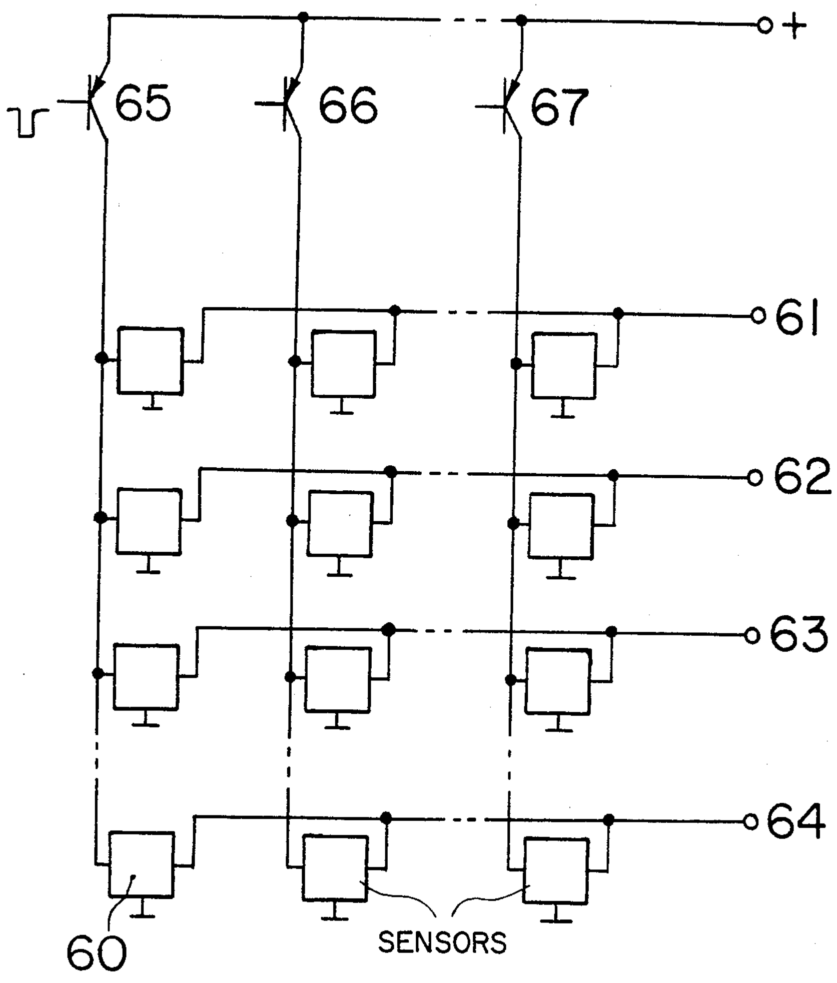
FIG. 4 is a schematic view of a sensor matrix for monitoring the position of the adjustment or setting elements.

The stepping motors 53 displace toothed racks for adjusting or setting the print rollers. The toothed racks carry a plurality, for example two, control devices which cooperate with stationary sensors 60. The sensors 60 which are used may be Hall probes, optical components or capacitive sensors. In FIG. 4, a matrix of the sensors 60 is illustrated. The sensors 60, with open collector output, have a common zero-voltage connection. The positive supply terminals extending via transistors represent the matrix columns, and the supply voltage terminals 61, 62, 63, 64 represent the lines of the matrix. The signal outputs 61 to 64 to the microprocessor 10 are interrogated in parallel and, depending upon the location of the control means with respect to the sensors 60, a signal appears on the base of one of the transistors or no signal appears. Selection of the columns occurs through the transistors 65, 66, 67 via which the supply lines of the sensors 60 are wired. The adjustment or setting signals are transmitted to the microprocessor 10. By means of the keyboard 40, time delays for the processing of these adjustment or setting signals are communicable to the microprocessor 10, so that an offset of the printed image i.e. a shifting of the stamp printing to a franking strip or other letter or package mailings, is afforded.

Through the use of a microprocessor 10 and the input of suitable information into the non-volatile memory 20, auxiliary or additional devices are connectible via the peripheral lines 11 and permit further economies and efficiencies in mail processing. Thus, for example, the adjustment or setting of the postage rates is controllable by a scale, or information regarding postage classification may be provided by means of an envelope machine. Furthermore, mailings to accounting departments are registrable or recordable, a journal or daily ledger printer logs franking sums charged and/or a coupling set-up with a data processing system may be used for statistical evaluations.

Further details regarding the cooperation of the control means and sensors may be readily derived from U.S. Pat. No. 4,398,458 assigned to the same assignee as that of the instant application, which clearly describes those features.

There are claimed:

1. Electronically controlled postage metering machine and/or free stamping machine having print rollers and a microprocessor, a non-volatile memory and a register by which adjustment of postage values, date, type of mailing and clearing of a preset value with actually charged postage sum are effected, comprising peripheral lines and a keyboard respectively connected to the microprocessor, the non-volatile memory and the register for introducing variable information and signals for linkage with preset data stored in the non-volatile memory; respective control modules prestaged to the non-volatile memory, the keyboard and the register for blocking direct access via said peripheral lines to the non-volatile memory; stepping motors for adjusting the print rollers of the postage metering machine, said stepping motors being controllable both individually and in parallel; the respective control module prestaged to the register having means cooperating with the register for controlling phase adjustment of said stepping motors via non-inverted and inverted outputs of the register, said stepping motors being operable in parallel, and including two driver stages connected thereto for supplying phase control data simultaneously to all of the stepping motors, one of said drivers supplying drive energy only to those stepping motors which have not yet reached the nominal position thereof.

2. Electronically controlled postage metering machine according to claim 1 wherein said phase adjustment control means include phase terminals to which diodes are connected for decoupling said phase terminals during parallel operation of the stepping motors.

3. Electronically controlled postage metering machine according to claim 1 including an accumulator operatively associated with the microprocessor, the non-volatile memory, the keyboard and the register, said accumulator serving to supply power to the electronic components, the keyboard and a display.

4. Electronically controlled postage metering machine according to claim 1 including stationary sensor means for establishing positions of the stepping motors and for transmitting information relative thereto to the microprocessor.

5. Electronically controlled postage metering machine according to claim 4 including adjustment means actuatable by the stepping motors, said adjustment means carrying control means for acting on said sensor means.

6. Electronically controlled postage metering machine according to claim 4 wherein said sensor means comprise Hall probes with an open collector output.

7. Electronically controlled postage metering machine according to claim 4 wherein said sensor means comprise optical components having an open collector output.

8. Electronically controlled postage metering machine according to claim 4 wherein said sensor means comprise capacitive sensors with an open collector output.

9. Electronically controlled postage metering machine according to claim 4 wherein said sensor means comprise a multiplicity of mutually connected sensors forming a matrix thereof.

10. Electronically controlled postage metering machine according to claim 9 including transistors connected to said sensors, and a positive voltage supply connected via said transistors to said sensors.

11. Electronically controlled postage metering machine according to claim 10 wherein said transistors address signal transmitters for the position of the stepping motors.

12. Electronically controlled postage metering machine according to claim 4 including time delay means for delaying to the microprocessor printing releasing signals of said sensor means for offsetting the printing image.

13. Electronically controlled postage metering machine according to claim 10 wherein said keyboard has means for controlling said time delay.

* * * * *